United States Patent
Mansour et al.

(10) Patent No.: US 9,104,803 B2
(45) Date of Patent: Aug. 11, 2015

(54) ON-DEMAND SOFTWARE TEST ENVIRONMENT GENERATION

(75) Inventors: Steve Farris Mansour, Milpitas, CA (US); Timothy Gordon Kimmet, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 182 days.

(21) Appl. No.: 13/342,880

(22) Filed: Jan. 3, 2012
(Under 37 CFR 1.47)

(65) Prior Publication Data

US 2012/0266135 A1   Oct. 18, 2012

Related U.S. Application Data

(60) Provisional application No. 61/429,391, filed on Jan. 3, 2011.

(51) Int. Cl.
| | |
|---|---|
| G06F 15/16 | (2006.01) |
| G06F 15/173 | (2006.01) |
| G06F 3/00 | (2006.01) |
| G06F 9/44 | (2006.01) |
| G06F 9/445 | (2006.01) |
| G06F 9/46 | (2006.01) |
| G06F 11/36 | (2006.01) |

(52) U.S. Cl.
CPC ........ *G06F 11/3648* (2013.01); *G06F 11/3664* (2013.01); *G06F 11/3684* (2013.01)

(58) Field of Classification Search
CPC .............. G06F 11/3688; G06F 11/079; G06F 11/1451; G06F 11/1456; G06F 8/20; G06F 8/61
See application file for complete search history.

(56) References Cited

U.S. PATENT DOCUMENTS

| | | | | |
|---|---|---|---|---|
| 6,460,068 | B1 * | 10/2002 | Novaes .......................... | 718/102 |
| 6,505,342 | B1 * | 1/2003 | Hartmann et al. ............ | 717/104 |
| 7,370,101 | B1 * | 5/2008 | Lakkapragada et al. ...... | 709/223 |
| 7,890,951 | B2 * | 2/2011 | Vinberg et al. ............... | 717/174 |
| 8,595,288 | B2 * | 11/2013 | Channabasavaiah et al. | 709/203 |
| 2003/0214525 | A1* | 11/2003 | Esfahany ...................... | 345/700 |
| 2004/0046785 | A1* | 3/2004 | Keller ........................... | 718/106 |
| 2007/0162894 | A1* | 7/2007 | Noller et al. .................. | 717/124 |
| 2007/0168970 | A1* | 7/2007 | Li et al. ......................... | 717/124 |
| 2007/0168971 | A1* | 7/2007 | Royzen et al. ................ | 717/124 |
| 2007/0234293 | A1* | 10/2007 | Noller et al. .................. | 717/124 |
| 2007/0283282 | A1* | 12/2007 | Bonfiglio et al. ............. | 715/762 |
| 2009/0125886 | A1* | 5/2009 | Owens et al. ................. | 717/124 |
| 2009/0292952 | A1* | 11/2009 | Merry ............................ | 714/38 |
| 2009/0300423 | A1* | 12/2009 | Ferris ............................. | 714/38 |

(Continued)

*Primary Examiner* — Don Wong
*Assistant Examiner* — Anibal Rivera
(74) *Attorney, Agent, or Firm* — Schwegman Lundberg & Woessner, P.A.

(57) ABSTRACT

A method and a system to create a software test environment on demand are described. An example system includes a dependency module to, upon receiving a command identifying a primary function to be created in a test environment, identify one or more dependencies of the primary function. The dependencies are other functions or databases that the primary function depends upon. The dependency module generates a topology of the test environment that indicates the relationship of the dependencies to the primary function. A provisioning module provisions a plurality of pools based on the topology. An enterprise service bus (ESB) routing module updates ESB routing of the primary function to route to the plurality of pools in the test environment. A credentials module provides credentials of the pools in the test environment.

20 Claims, 5 Drawing Sheets

(56) References Cited

U.S. PATENT DOCUMENTS

| | | | |
|---|---|---|---|
| 2010/0031247 A1* | 2/2010 | Arnold et al. | 717/174 |
| 2010/0146514 A1* | 6/2010 | Alexander et al. | 718/104 |
| 2010/0198960 A1* | 8/2010 | Kirschnick et al. | 709/224 |
| 2011/0010691 A1* | 1/2011 | Lu et al. | 717/124 |
| 2011/0225636 A1* | 9/2011 | Keith et al. | 717/101 |
| 2012/0117531 A1* | 5/2012 | Rosenbaum et al. | 717/100 |

* cited by examiner

ON-DEMAND SOFTWARE TEST ENVIRONMENT GENERATION

This application claims the priority benefit of U.S. Provisional Application No. 61/429,391, filed Jan. 3, 2011 and entitled "On-demand software test environment generation", which is incorporated herein by reference.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2011, All Rights Reserved.

TECHNICAL FIELD

The present application relates generally to the technical field of network communications and, in one specific example, to on-demand software test environment generation.

BACKGROUND

In software development, test environments are created by computer scientists to mimic an existing software environment. Examples of existing software environments include online marketplaces that provide a number of services such as item descriptions, inventory management, payment services, shipping services, conflict resolution services, and the like. If one of these services fails or is updated, the test environment may be used to mimic the service to identify problems or determine how the update will affect the service or other services.

"Production environment" is used to refer to the website or machine farm made available to the company's customer base. Typically, there are a large number of physical machines (or virtual machines running on one or more physical machines) in the production environment. The quality assurance (QA) environment is where a QA team tests the software before releasing it to the production environment. The build environment is where the build team builds the software that is ultimately tested by the QA team and released to the production environment. The Continuous Integration (CI) environment is where the build team builds and tests code during its development. The QA, Build, and CI environments typically contain a significantly smaller number of computers than the production environment.

One of the common problems is to create a testing environment that represents a scaled down version of what is in the production environment to enable developers to debug a problem in their software and for QA teams to test the software. However, these environments, while functionally close to the production environment, are often inconsistent in small ways, allowing problems to slip through testing and into the production environment. Since the testing environments are often managed by different teams, OS versions, the software stack, and other software tools are often different on test environments than the production environment. These differences can mask problems in test environments that are not discovered until the software is implemented in the production environment.

Often, these environments represent additional cost in terms of physical hardware and the people needed to create and manage them. As there are typically few of these test environments, there is a high degree of contention for their use. It is often the case that developers cannot get the test environment when they need it. Moreover, the testing environments require significant human intervention to manage the lifecycle. Therefore, teams who fund the construction of such environments do not share them with other teams. These environments become under-utilized and very costly as a result and are often created over capacity. The net result of not having the test environments is that the software is not as stable as it should be, failures occur on the company website, and customers are either unhappy or leave and go to a competitor's website.

BRIEF DESCRIPTION OF THE DRAWINGS

Some embodiments are illustrated by way of example and not limitation in the figures of the accompanying drawings in which.

DETAILED DESCRIPTION

An example cloud manager and methods to create software test environments are described. In the following description, for purposes of explanation, numerous specific details are set forth in order to provide a thorough understanding of example embodiments. It will be evident, however, to one skilled in the art that the present invention may be practiced without these specific details.

A function is a function performed by the website or a feature provided by the website. A software test environment is created by a cloud manager in response to receiving a command identifying the function to be tested. Each function may include one or more dependencies which are other functions required to execute the function. The test environment is isolated in that it has no known dependencies on functions outside the test environment. The test environment is also correct in that it contains each function required by the function being tested. By virtue of knowing dependency information about a particular function or feature, an isolated, correct test environment is automatically, without human intervention, created.

The following terms are used herein and defined accordingly:

Virtual Assets:
Topology—the definition of connections between machines in the cloud that form a useful function.
Environment—a subset of topologies instantiated in the cloud.
Cloud Manager—a software program that provisions an instance of a topology within the cloud.

Physical Assets:
Cloud—a collection of physical hardware and software services that can be automatically configured to reflect topologies.
Compute Units—a computer or virtual machine that can be addressed as a computer.
Cache—the compute units in a cloud (computers, load balancers, networks, etc.) currently not in use (or in use, but has excess capacity for others to share), but available for use.
Pool—one or more computers, each configured identically, that perform a site function or host a site feature. A network request to a pool can be processed by any computer in that pool.
Verbs:
Provision—Via software configuration, create the connections between the physical assets necessary to create an instantiation of a topology.
Add/Remove—Add physical assets to or remove physical assets from the physical instantiation of a topology.
Decommission—Via software, disconnect the assets in an instantiation of a topology, scrub them clean (if required) and return the assets to the cache.

Figure 1:
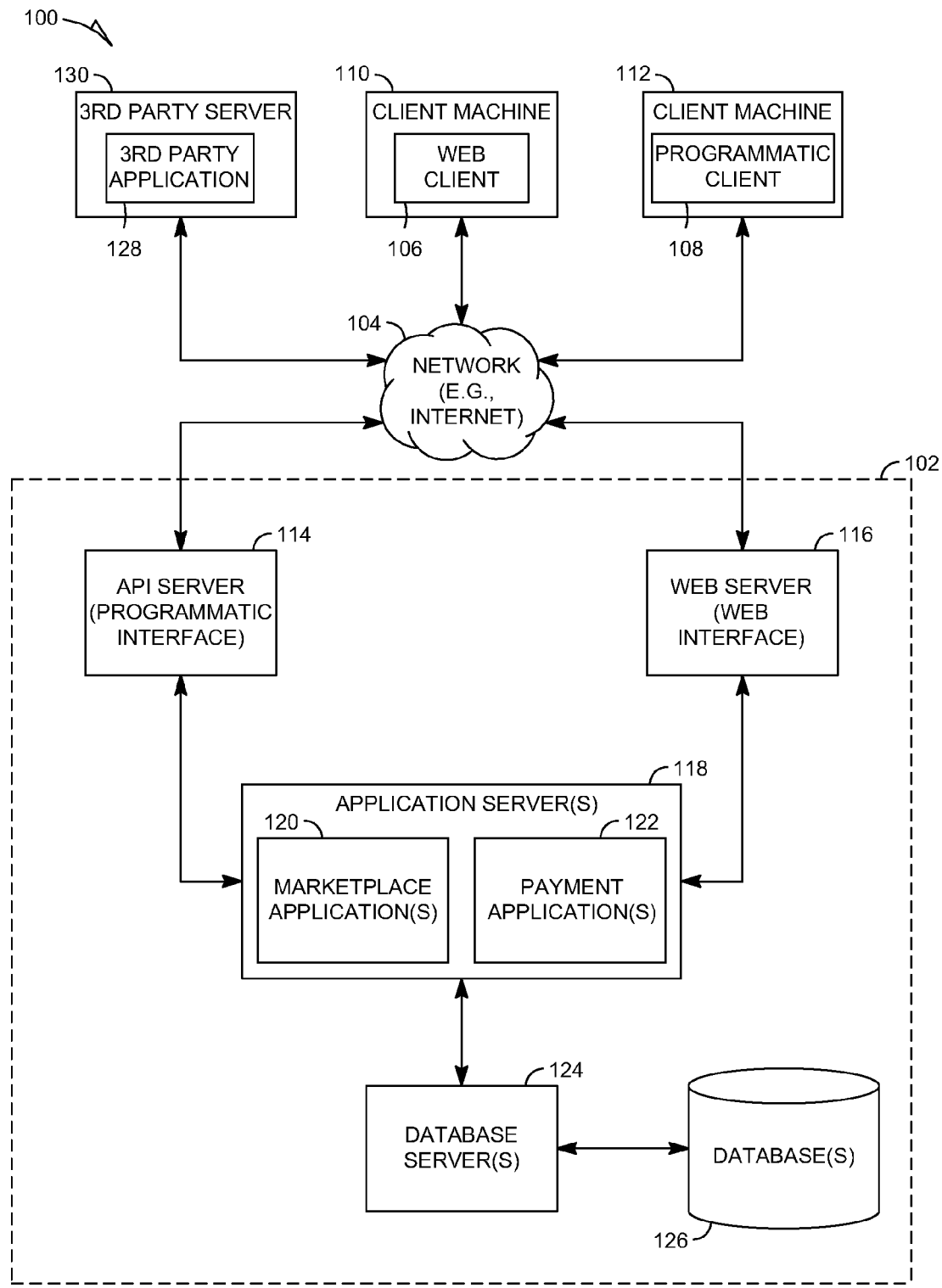
FIG. 1 is a network diagram depicting a client-server system, within which one example embodiment may be deployed.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

The components of FIG. 1 communicate using a Domain Name System (DNS). For example, when web client 106 wants to contact API Server 114, the DNS capabilities of the web client 106 and the API server 114 are used to determine how the web client 106 contacts the API server 114.

A test environment may include all (or a portion of) the components depicted in FIG. 1, including the client machines 110 and 112, and the third party server 130.

Figure 2:
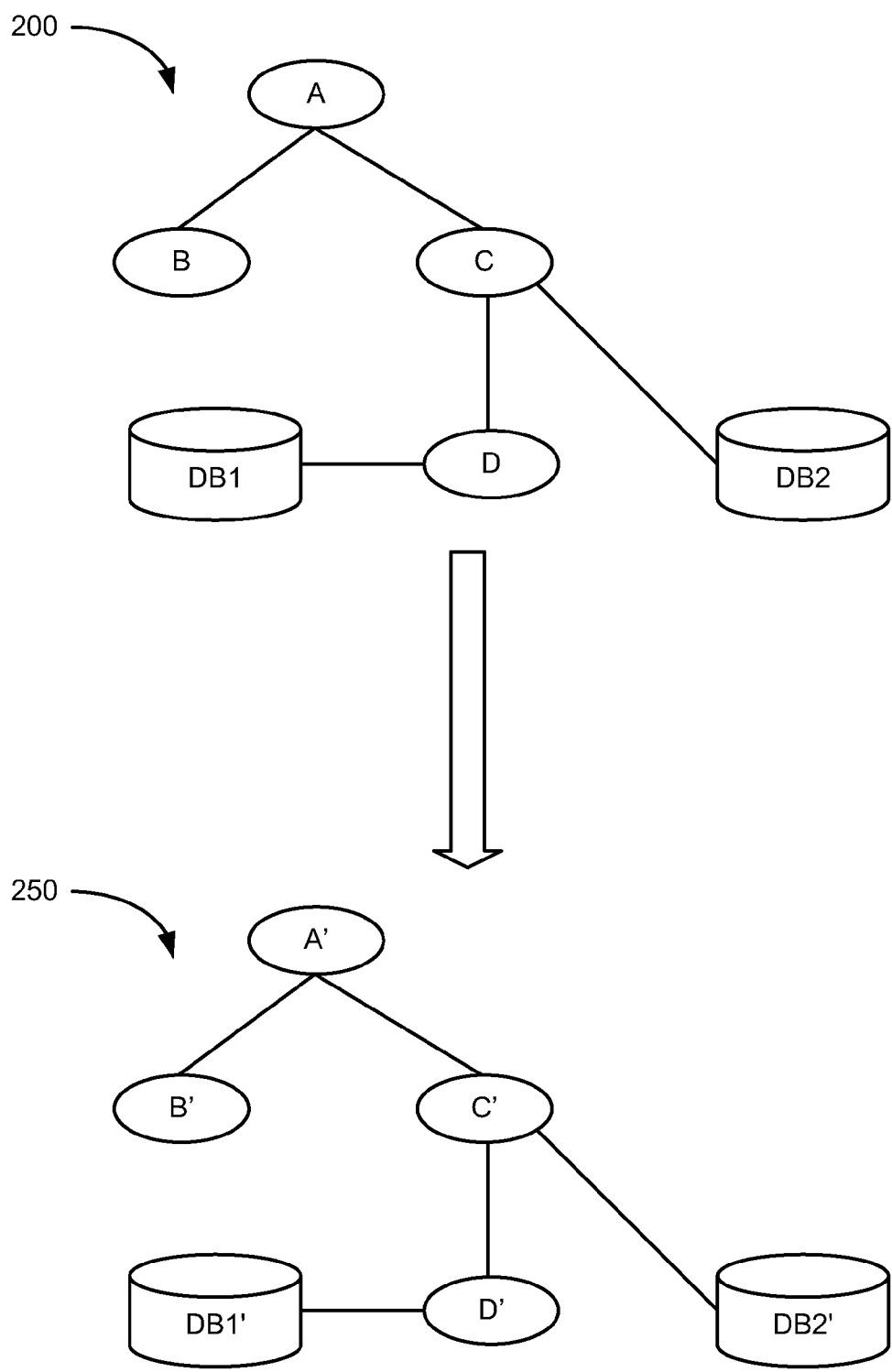
FIG. 2 is a model of an example topology used to perform a function or provide a feature within the client-server system.

FIG. 2 is a model of an example topology 200 used to perform a function or provide a feature within the client-server system. In the client-server system of FIG. 1, the production environment may include hundreds or even thousands of functions (i.e., site features) that are inter-dependent. Each function may be implemented by a pool of machines.

The topology 200 may be implemented using a number of compute units. The group of compute units assigned to perform an individual function is referred to as a pool. To illustrate, the topology 200 includes a function A that depends on functions B and C. Function C, in turn, depends on function D and accesses data stored in a database DB2. Function D, in turn, accesses data stored in database DB1. In the production environment, each of the functions A, B, C, and D may be implemented in pools having any number of machines dedicated to performing the respective functions.

In some instances, the topology 200 is represented by a graph, as shown in FIG. 2. In other instances, the topology may be represented by a series of entries in a database that stores records of dependencies between functions.

In response to receiving a command to create a test environment for function A, a topology 250 is created by accessing stored dependency information. The topology 250 includes function A' that performs the same function as function A. However, function A' may be implemented by only one machine instead of a larger group of machines. Similarly, machines to perform other functions that function A' is dependent on (as depicted, functions B', C', and D') are commissioned Like function A, the other functions may be performed by a pool having many machines in the production environment but may be implemented by fewer machines in the test environment.

In the topology 250, the function A is performed by the pool A' and, when the function A' calls function B, the pool B' is called instead of function B (which may be implemented in the production environment or another testing environment).

Figure 3:
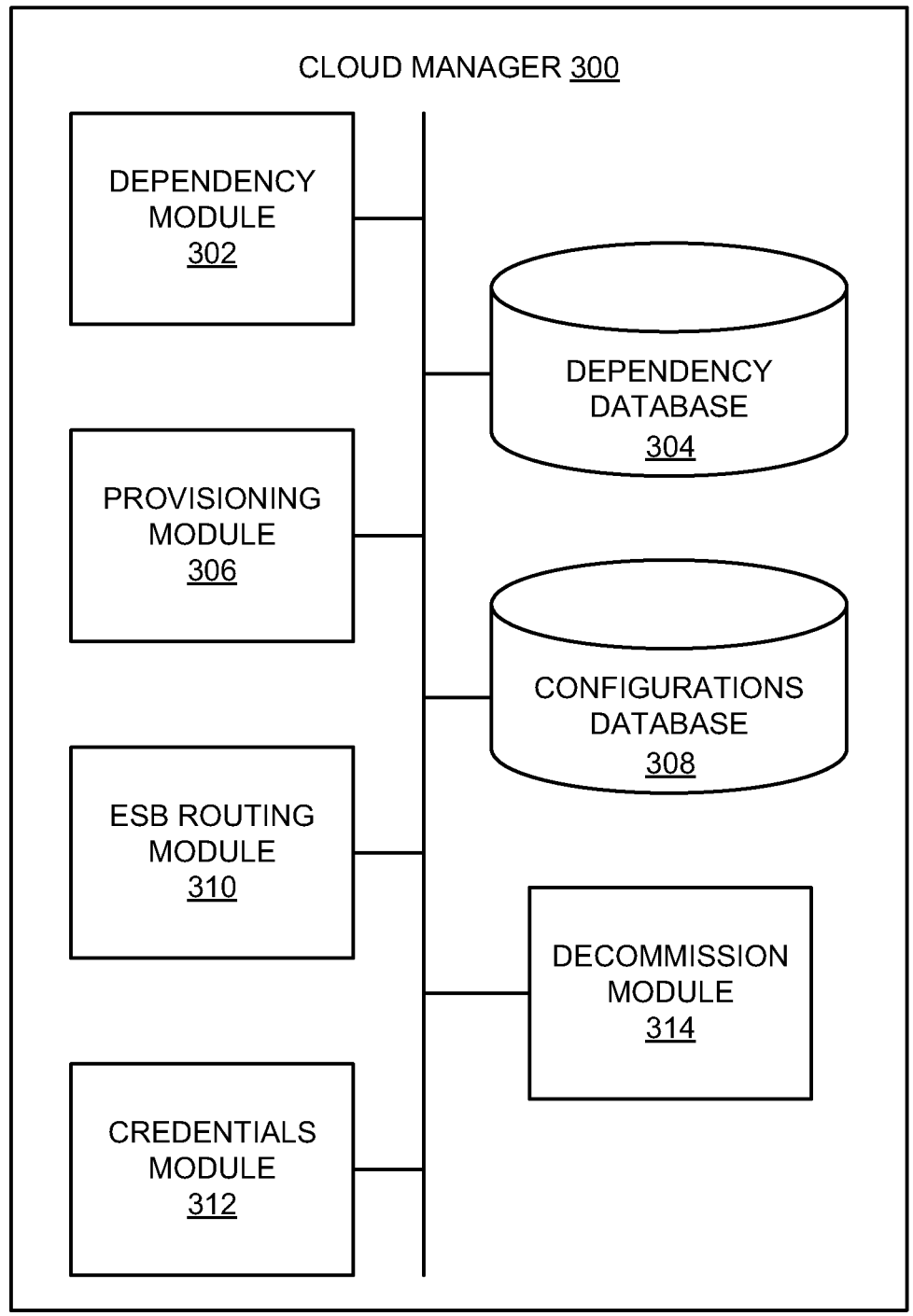
FIG. 3 is a block diagram of an example cloud manager, according to various embodiments.

FIG. 3 is a block diagram of an example cloud manager 300, according to various embodiments. The cloud manager 300 may be part of the systems provided by the application server 118 of FIG. 1. The cloud manager 300 may perform additional functions not discussed herein.

A dependency module 302 is configured to receive a command to create a test environment for a particular function. The command identifies the function to be created in the test environment (i.e., a primary function) and the number of machines to commission for each function or functions on which the function is dependent (i.e., the remaining functions of the topology that the primary function is dependent on or secondary functions). One example of a command is "createsystem(payment, 3)". This command requests that a test environment be created to mimic the function "payment" where three machines and a load balancer are commissioned for each function in the topology associated with the desired function. The functions may be identified by name, attribute, or in another way.

The number of machines indicates how many machines to commission in the test environment for the pools implementing the primary function and the secondary functions on which the function is dependent. The default number of machines may be one, which would result in a functional equivalent of the function in the test environment. In a production environment, however, each function may be distributed or reproduced across multiple machines in the pool that are managed using one or more load balancers. In some instances, the developer may desire to replicate a function operating on more than one machine to, for example, detect issues with load balancing or running the function on more than one machine. For example, the developer, in the command to create the function, may indicate that three machines be commissioned for each pool represented in the topology.

The dependency module 302, upon receiving the command, next identifies the secondary functions in the topology corresponding to the function indicated in the command. The dependency module 302 may access a dependency database 304 that stores records of dependency information. The records of dependency information may be declared or logged. Declared dependency information is information stored by the developers when the function was generated. Logged dependency information is information observed when the function is implemented. The dependency information may be validated in the production environment.

The dependency module 302 may first access a first record corresponding to the primary function. The first record may include a list indentifying a first set of secondary functions that the primary function is directly dependent upon. For example, returning to FIG. 2, the dependency module 302, upon receiving a command identifying function A accesses a first record stored in the dependency database 304 that identifies functions B and C as being secondary functions that function A is directly dependent upon. The dependency module 302 then identifies any additional functions that functions B and C depend on. As depicted, function B does not include any dependencies but function C further depends on function D and database DB2. The record corresponding to function C may identify function D and database DB2. Function D, as depicted, further depends on database DB1 and a record of function D may indicate this dependency. Thus, by going through the records of each function, all of the functions or databases necessary to providing the primary function (e.g., function A) can be identified for addition to the test environment. Using the dependencies, stored in the dependency database 304, the topology 250 of the test environment is generated.

Upon accessing the topology 250 of the test environment, a provisioning module 306 is configured to provision pools of machines to perform the functions of the topology of the test environment (e.g., topology 250). The provisioning module 306 may access a configurations database 308 to configure each pool in the topology 250. The provisioning module 306 may provision the pools in the test environment using the same code that the pool in the production environments are running, or using an updated code that is to be tested in the test environment. The provisioning module 306 further provisions databases that are included in the test environment (e.g., databases DB1' and DB2' in topology 250). The databases in the test environment may or may not include any records.

An enterprise service bus (ESB) module 310 is configured to update the ESB routing within the test environment (e.g., topology 250). The updated routing causes a service request from function A' to be directed to function B' or C' (in the test environment) instead of function B or C (in the production environment or to another function in a separate test environment), and likewise for function D' and databases DB1' and DB2'.

In some instances, requests or other calls may be directed using a DNS service instead of the ESB. Each compute unit in the test environment is configured to use the DNS service that is created as part of the test environment. The compute units in the test environment are assigned domain names that are distinct from the domain names assigned to compute units in the production environment or another environment.

A credentials module 310 is configured to identify the machine names (e.g., actual machine names or virtual machine names) for the provisioned pools of machines. The credentials module 310 communicates these names and log-ins or other credentials needed to access the pools. Upon receiving the credentials, the developers may use the test environment. In some instances, the developers may test the current code to replicate observed issues or to identify unknown issues, or update the code and troubleshoot the updated code.

When the developers are finished using the test environment, a decommission module 314 decommissions the pools for the functions and databases in the test environment and returns the assets to the cache. The decommission module 314 may further remove the ESB routing within the test environment provided by the ESB routing module 310. The decommission module 314 may access the topology 250 generated by the dependency module 302 or an identification of the virtual machines generated by the provisioning module 306 or the credentials module 312 to identify the assets included in the test environment.

Figure 4:
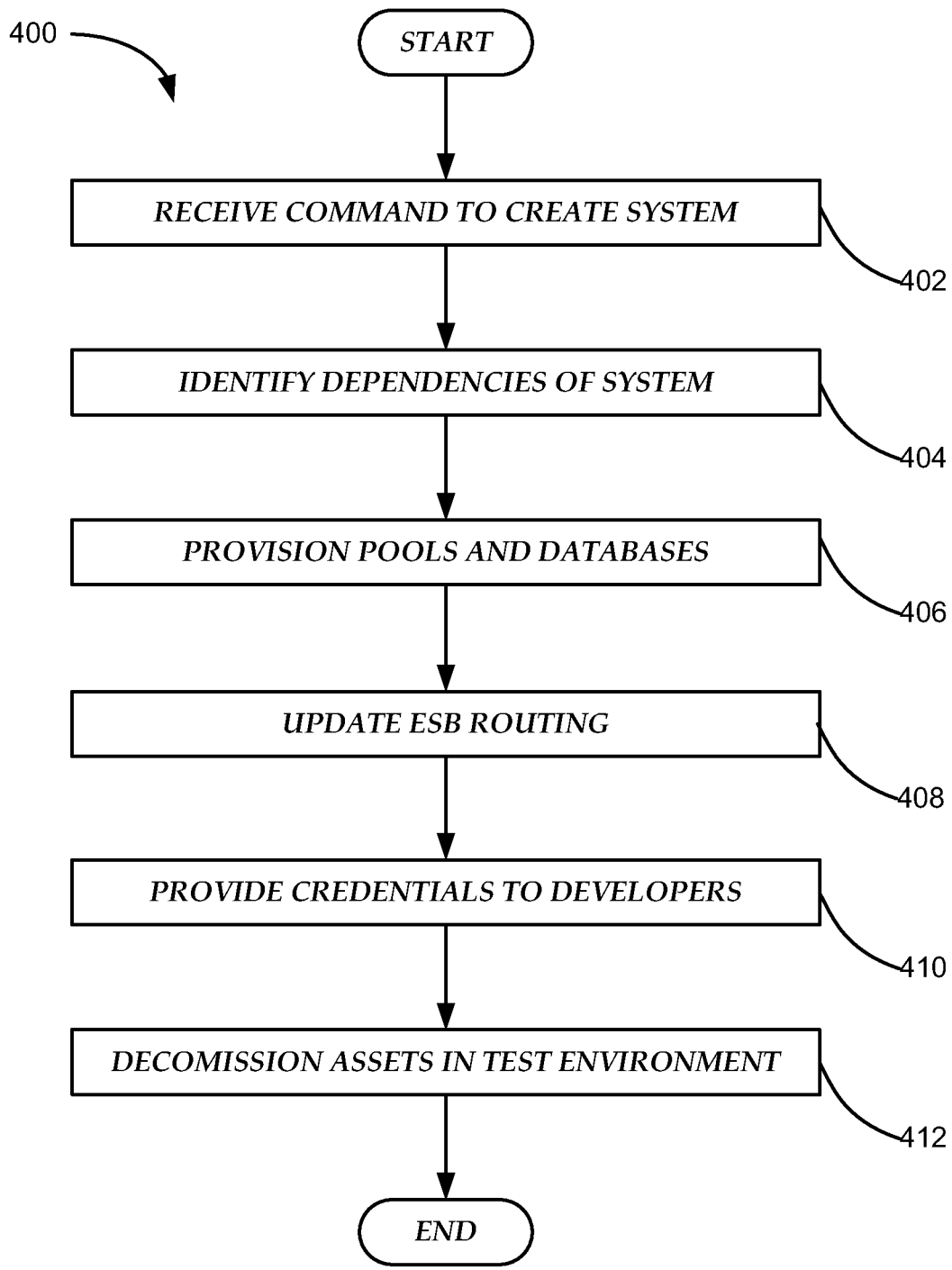
FIG. 4 is a flowchart illustrating an example method, according to various embodiments.

FIG. 4 is a flowchart illustrating an example method 400, according to various embodiments. The method 400 may be performed by the cloud manager 300 or by another system. In some embodiments, the method 400 is performed using one or more processors.

In an operation 402, a command is received to create a system. The command may be received from another system or from a software developer. The command includes an identification of a function or feature of a website to be tested. The command further includes an indication of the number of assets to be created within each pool. When a command indicates that more than one asset be assigned to a particular pool, additional assets, such as load balancers may also be assigned to the pool that would not be assigned if the pool only includes one instance.

In an operation 404, the dependencies of the function identified by the command are identified. The dependencies include other features or functions that the identified function depends upon. The dependencies may further include databases accessed by the primary function or a function that the primary function depends on. The dependencies may be logged or observed dependencies. The observed dependencies may be observed using call logs, charge backs, or tracers.

In an operation 406, pools and databases are provisioned from the cache according to the topology of the identified function. If more than one asset is to be included in each pool, load balancers and other assets may be provisioned. The pools and databases may be provisioned in an environment created for testing that is separate or isolated from the production environment, such as a core staging environment.

In an operation 408, ESB routing between the provisioned assets is updated. The ESB routing dictates that requests sent from the pools in the test environment be directed to pools in the same test environment.

In an operation 410, the credentials of the assets in the test environment are provided to the developers who will be using the test environment. The credentials may include asset identifiers, login credentials, and other information about the test environment. The credentials may include domain names assigned by a DNS service in the test environment.

In an operation 412, when the developers are finished using the test environment, the assets in the test environment are decommissioned and returned to the cache.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 5:
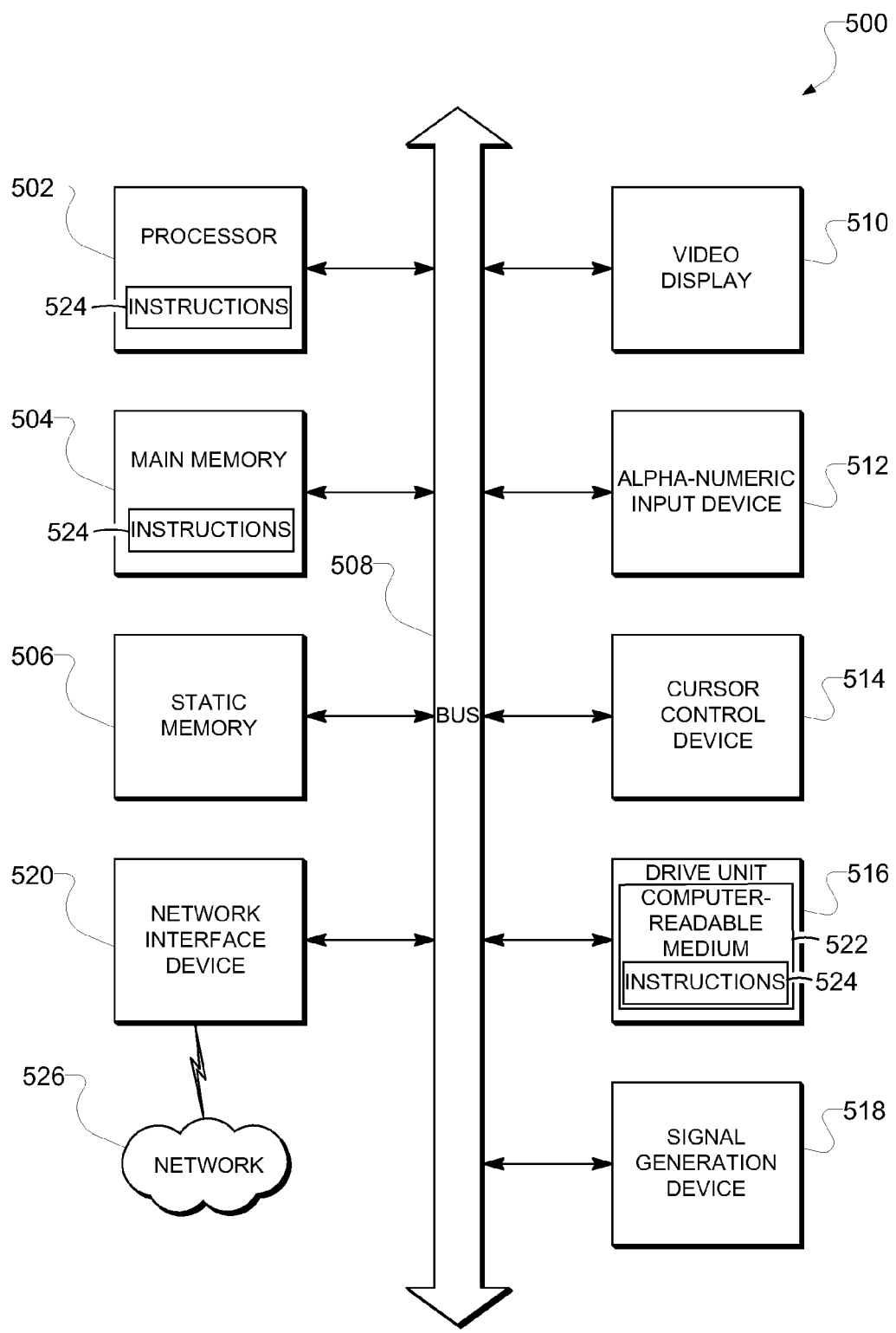
FIG. 5 is a diagrammatic representation of machine in the example form of a computer system within which a set of instructions, for causing the machine to perform any one or more of the methodologies discussed herein, may be executed.

FIG. 5 is a block diagram of machine in the example form of a computer system 500 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard or a touch-sensitive display screen), a user interface (UI) navigation device 514 (e.g., a mouse), a disk drive unit 516, a signal generation device 518 (e.g., a speaker) and a network interface device 520.

Machine-Readable Medium

The disk drive unit 516 includes a machine-readable medium 522 on which is stored one or more sets of instructions and data structures (e.g., software) 524 embodying or utilized by any one or more of the methodologies or functions described herein. The instructions 524 may also reside, completely or at least partially, within the main memory 504 and/or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 524 may further be transmitted or received over a communications network 526 using a transmission medium. The instructions 524 may be transmitted using the network interface device 520 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system having a processor comprising:
   a dependency module using one or more processors configured to:
      receive a command to create a test environment, the command comprising a primary function to be tested in the test environment,
      identify one or more dependent functions of the primary function, the dependent functions comprising:
         functions that the primary function directly depends upon or databases the primary function accesses or both;
         one or more additional dependencies that the dependent functions depend upon; and
         information stored in a database and information observed when implementing the primary function; and
      generate a topology within the test environment that encapsulates the dependent relationship of the dependent functions to the primary function;
   a provisioning module configured to provision each of a set of pools based on the topology within the test environment separate from the production environment, the provisioning results in a test environment that does not depend on dependent functions outside the test environment;
   an enterprise service bus (ESB) routing module configured to update ESB routing of the primary function to route from pools outside the environment to the set of pools within the test environment; and
   a credentials module configured to provide credentials of the pools to a developer, the credentials allow the developer to access the test environment.

2. The system of claim 1, wherein the command includes an indication of a number of assets to provision for each function in the test environment.

3. The system of claim 2, wherein the number of assets is greater than one and wherein the provisioning module is further to provision a respective load balancer in the respective pools of the plurality of pools.

4. The system of claim 1, wherein the provisioning module is configured to provision databases.

5. The system of claim 1, wherein the dependency module is configured to generate the topology based on records accessed from a dependency database, the records including an identification of the one or more secondary functions corresponding to the primary function.

6. The system of claim 1, wherein the provisioning module is further configured to provision the assets based on records stored in a configurations database.

7. The system of claim 1, wherein the provisioning module is further configured to provision the assets based on code that is used in a production environment.

8. The system of claim 1, further comprising a decommission module to decommission the pools in the test environment.

9. The system of claim 1, wherein the test environment is set up within a quality assurance (QA) environment.

10. The system of claim 1, wherein the credentials of the pools comprise identifiers of the pools and login credentials.

11. The system of claim 1, wherein the dependent functions are declared dependencies or observed dependencies.

12. A method comprising:
   receiving a command to create a test environment, the command comprising of a primary function to be tested in a test environment,
   identifying one or more dependent functions of the primary function using one or more processors, the dependent functions comprising:
      functions that the primary function directly depends upon or databases the primary function accesses or both; and
      one or more additional dependencies that the dependent functions depend upon;
   generating a topology within the test environment that encapsulates the dependent relationship of the dependent functions to the primary function;
   provisioning each of a set of pools based on the topology in the test environment separate from the production environment, resulting in a test environment that does not depend on dependent functions outside the test environment;
   updating ESB routing of the primary function to route from pools outside the environment to the set of pools within the test environment; and
   providing credentials of the pools in the test environment.

13. The method of claim 12, wherein the command includes an indication of a number of assets to provision for each function in the test environment.

14. The method of claim 13, wherein the number of assets is greater than one and wherein the provisioning further comprising provisioning a respective load balancer in the respective pools of the plurality of pools.

15. The method of claim 12, wherein the generating of the topology is based on records accessed from a dependency database, the records including an identification of the one or more secondary functions corresponding to the primary function.

16. The method of claim 12, wherein the provisioning module is further to provision the assets based on code that is used in a production environment.

17. The method of claim 12, further comprising decommissioning the pools in the test environment.

18. The method of claim 12, wherein the test environment is set up within a quality assurance (QA) environment.

19. The method of claim 12, wherein the dependent functions are declared dependencies or observed dependencies.

20. A non-transitory machine-readable medium having instructions embodied thereon, the instructions executable by one or more machines to perform operations comprising:
   receiving a command to create a test environment, the command comprising of a primary function to be tested in a test environment,
   identifying one or more dependent functions of the primary function using one or more processors, the dependent functions comprising:

functions that the primary function directly depends upon or databases the primary function accesses or both;
information stored in a database; and
information observed when implementing the primary function;

generating a topology within the test environment that encapsulates the dependent relationship of the dependent functions to the primary function;

provisioning each of a set of pools based on the topology in the test environment separate from the production environment, resulting in a test environment that does not depend on dependent functions outside the test environment;

updating ESB routing of the primary function to route from pools outside the environment to the set of pools within the test environment; and providing credentials of the pools in the test environment.

* * * * *

UNITED STATES PATENT AND TRADEMARK OFFICE
CERTIFICATE OF CORRECTION

PATENT NO. : 9,104,803 B2  
APPLICATION NO. : 13/342880  
DATED : August 11, 2015  
INVENTOR(S) : Mansour et al.

Page 1 of 1

It is certified that error appears in the above-identified patent and that said Letters Patent is hereby corrected as shown below:

Claims

In column 12, line 2, in Claim 7, delete "furtherconfigured" and insert --further configured--, therefor Signed and Sealed this
Nineteenth Day of January, 2016

Michelle K. Lee
*Director of the United States Patent and Trademark Office*